US007735098B2

(12) United States Patent
Chang

(10) Patent No.: US 7,735,098 B2
(45) Date of Patent: Jun. 8, 2010

(54) METHOD FOR EXECUTING COMPUTER PROGRAMS IN ACCORDANCE WITH PRESET EXECUTION PRIORITY

(75) Inventor: Yu-Chia Chang, Sanchong (TW)

(73) Assignee: Getac Technology Corporation, Hsinchu (TW)

( * ) Notice: Subject to any disclaimer, the term of this patent is extended or adjusted under 35 U.S.C. 154(b) by 1294 days.

(21) Appl. No.: 11/230,662

(22) Filed: Sep. 21, 2005

(65) Prior Publication Data

US 2007/0022431 A1 Jan. 25, 2007

(30) Foreign Application Priority Data

Jul. 22, 2005 (TW) .............................. 94125003 A

(51) Int. Cl.
*G06F 3/038* (2006.01)
(52) U.S. Cl. ................................. 719/328; 713/1; 713/2
(58) Field of Classification Search .................. 719/328, 719/321
See application file for complete search history.

(56) References Cited

U.S. PATENT DOCUMENTS

| | | | |
|---|---|---|---|
| 5,802,365 A * | 9/1998 | Kathail et al. ................ | 719/321 |
| 6,763,458 B1 | 7/2004 | Watanabe et al. | |
| 7,076,646 B2 | 7/2006 | Chang | |
| 7,228,408 B2 * | 6/2007 | Wu et al. ....................... | 713/1 |

FOREIGN PATENT DOCUMENTS

| | | |
|---|---|---|
| JP | 2000-20285 | 1/2000 |
| JP | 2005-134985 | 5/2005 |

OTHER PUBLICATIONS

Communication from the German Patent Office regarding a corresponding German Patent Application 10 2005 054 773 dated Oct. 1, 2007.

* cited by examiner

*Primary Examiner*—Hyung S Sough
*Assistant Examiner*—Syed Roni
(74) *Attorney, Agent, or Firm*—Quintero Law Office, PC

(57) ABSTRACT

A method for executing computer programs in accordance with a preset priority is provided. The method is applicable to a computer system connecting to a data storage, a plurality of device selection buttons, and a plurality of multimedia players. The data storage is installed with a plurality of device drivers, a plurality of device application programs, and a program execution priority table. The program execution priority table defines correspondence between the device selection buttons and the multimedia players, and the priority order of execution of the device drivers and the device application programs of the multimedia players. When the computer detects any device selection button is pressed, the computer executes the device drivers and the device application programs corresponding the multimedia player in the priority order defined by the program execution priority table.

16 Claims, 7 Drawing Sheets

| Device Selection Button Field | Device Selection Button Code Field | Device Selection Button Corresponding Device Field | Priority Field For Execution Corresponding Device Driver And Application Program Of The Device |
|---|---|---|---|
| First Device Selection Button(21) | 00 | CD Player(3a) | (1)Audio Device Driver(181)<br>(2)CD Player Driver (183)<br>(3)CD Player Application Program(191) |
| Second Device Selection Button(22) | 01 | Digital Music Player(3b) | (1)Audio Device Driver(181)<br>(2)Digital Music Device Driver(184)<br>(3)Digital Music Device Application Program(192) |
| Third Device Selection Button(23) | 10 | VCD Player(3c) | (1)Audio Device Driver(181)<br>(2)VCD Player Driver(185)<br>(3)VCD Player Application Program(193) |
| Forth Device Selection Button(24) | 11 | TV Signal Receiver(3d) | (1)Audio Device Driver(181)<br>(2)Display Driver(182)<br>(3)TV Signal Receiver Driver(186)<br>(4)TV Playing Application Program(194) |

FIG.4

METHOD FOR EXECUTING COMPUTER PROGRAMS IN ACCORDANCE WITH PRESET EXECUTION PRIORITY

FIELD OF THE INVENTION

The present invention relates to a method of booting a computer device and, more particularly, to a method for execution of computer programs in accordance with a preset execution priority.

BACKGROUND OF THE INVENTION

The hardware design of a personal computer (PC) system is different from the design of a household appliance. Hence, the time required for booting a computer system is much longer than the time required for turning on a household appliance. In the majority of the current multimedia playing systems, the design is to connect the multimedia player to the computer system through a computer interface. Therefore, when the user intends to execute the multimedia playing function, the user needs to execute the application program of the multimedia player through the computer system. That is, the user must first boot the computer system. The booting process includes the BIOS initialization, POST program, peripheral detection and driving, operating system (OS) activation, system configuration setting, and so on. After the booting process is complete, the user can activate the application program for the multimedia player. The waiting time for the user is long and tedious.

SUMMARY OF THE INVENTION

The aforementioned drawbacks prevent the PC-based multimedia playing systems from fast booting as the household appliances. If the computer system can be booted as fast as the average household appliances, the added value of the computer system will be greatly enhanced.

When the user uses a computer system, the user seldom uses all the functions available in the computer system. The user usually uses some functions, such as listening music, or watching TV or films. However, the booting of the computer system requires the system to load all the hardware and software. To use a certain function, the user must wait until the system initializes all the hardware of the computer system.

Therefore, the primary object of the present invention is to provide a booting method of a multimedia playing system. Through the control of the present invention, the user can initialize only the corresponding hardware of the intended application, and execute the computer application programs according to a preset execution priority.

Another object of the present invention is to provide a method for execution of computer programs according to a preset execution priority. By a preset priority table stored in a data storage of the computer system, the present invention manages the initialization of device drivers and application programs of multimedia players.

Yet another object of the present invention is to provide a method for computer program initialization with the selections between initializing the computer function or the multimedia playing function. When the user boots the computer normally, the computer system selects a first operating system in the hard disk for the booting operating system. When the user presses any function selection button, the computer system selects a second operating system in the hard disk for the booting operating system, and executes the device drivers and application programs of the multimedia players according to a preset priority so that the selected device can be rapidly available for execution.

To achieve the aforementioned objects, the present invention installs a plurality of device drivers, a plurality of device application programs, and a program execution priority table in the data storage of a computer system. The program execution priority table defines the multimedia players corresponding to the device selection buttons, and the execution priority of device drivers and application programs of the multimedia players. When the press of a device selection button is detected, the computer system executes the device driver and application program sequentially according to the priority defined in the execution priority table.

Through the control of the present invention, a multimedia playing system with multiple function selections, such as CD, VCD, digital music, TV, can have a preset execution priority for each device according to the requirements of each multimedia player. For execution, the programs with higher priorities are loaded and executed first. During the execution, the remaining programs with lower priorities will be loaded for execution. This creates the sense of a faster booting process for the user.

These and other objects, features and advantages of the invention will be apparent to those skilled in the art, from a reading of the following brief description of the drawings, the detailed description of the preferred embodiment and the best modes for carrying out the present invention, and the appended claims.

BRIEF DESCRIPTION OF THE DRAWINGS

The present invention can be understood in more detail by reading the subsequent detailed description in conjunction with the examples and references made to the accompanying drawings, wherein:

FIG. 4 shows schematic view of the contents of the program execution priority table;

DETAILED DESCRIPTION OF THE PREFERRED EMBODIMENTS

Figure 1:
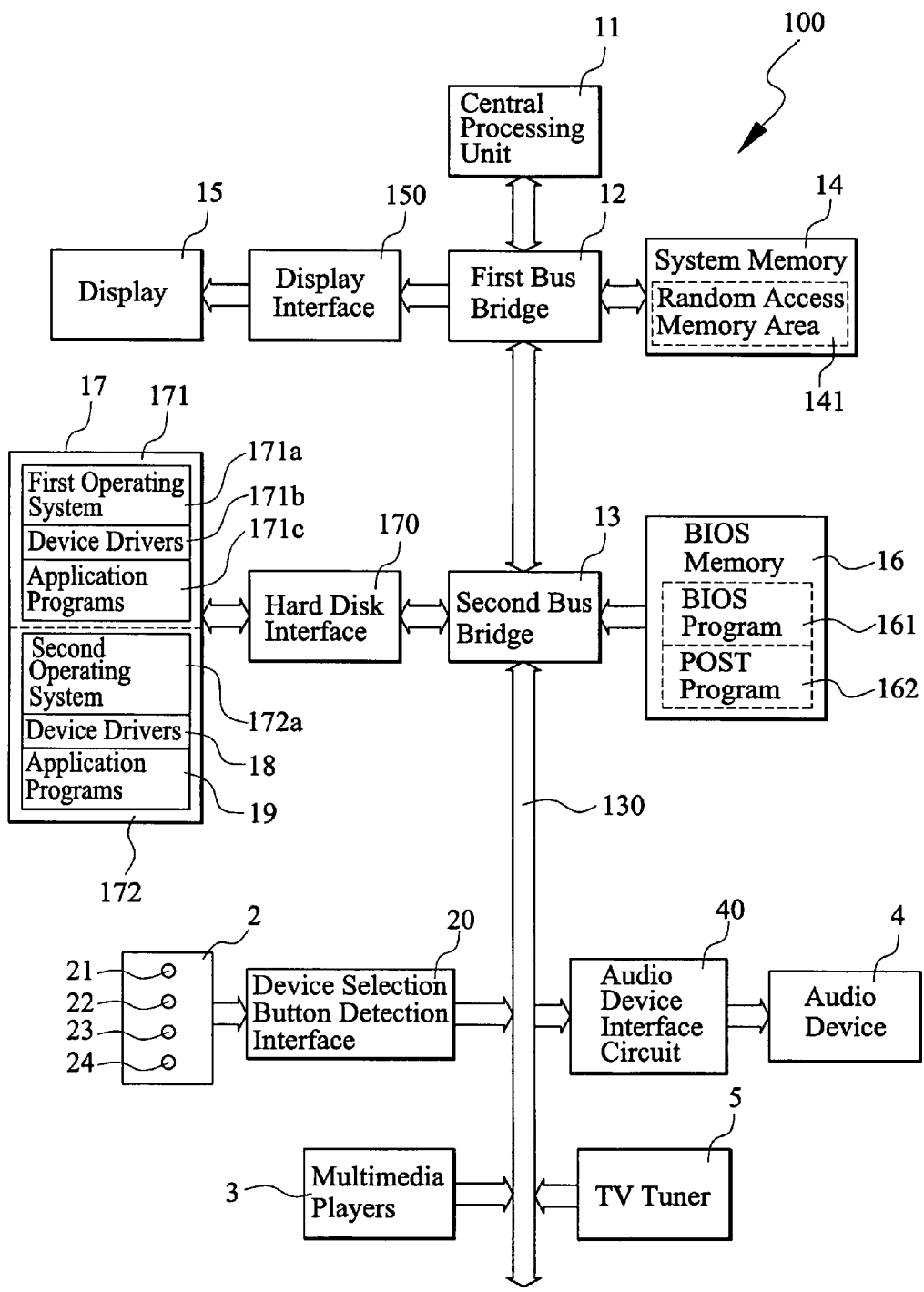
FIG. 1 is a system functional block diagram of a first embodiment of the present invention.

With reference to the drawings and in particular to FIG. 1, which shows a system functional block diagram in accordance with a first embodiment of the present invention, a computer system 100 comprises a central processing unit 11, a first bus bridge 12, and a second bus bridge 13. The central processing unit 11 is connected to the first bus bridge 12 through a system bus. The first bus bridge 12 is connected to a system memory 14, and is connected to a display 15 through a display interface 150.

The second bus bridge 13 is connected to a BIOS memory 16. The BIOS memory 16 stores a BIOS program 161, and a power on self test (POST) program 162.

The second bus bridge 13 is connected to a hard disk interface 170 through a bus. The hard disk interface 170 is connected to a hard disk 17. The hard disk 17 is for the data storage of the present invention.

The hard disk 17 is segmented into a first partition 171 and a second partition 172. The first partition 171 is installed with a first operating system 171a, and other device drivers 171b and application programs 171c, which can operate under the first operating system 171a. The first operating system 171a can be a Windows operating system. The second partition 172 can be installed with a second operating system 172a, such as Linux-based Operating system, or other types of operating systems, including tiny Windows-based operating system, and embedded operating system. The second partition 172 also stores a plurality of device drivers 18 and application programs 19, which can operate under the second operating system 172a.

Figure 2:
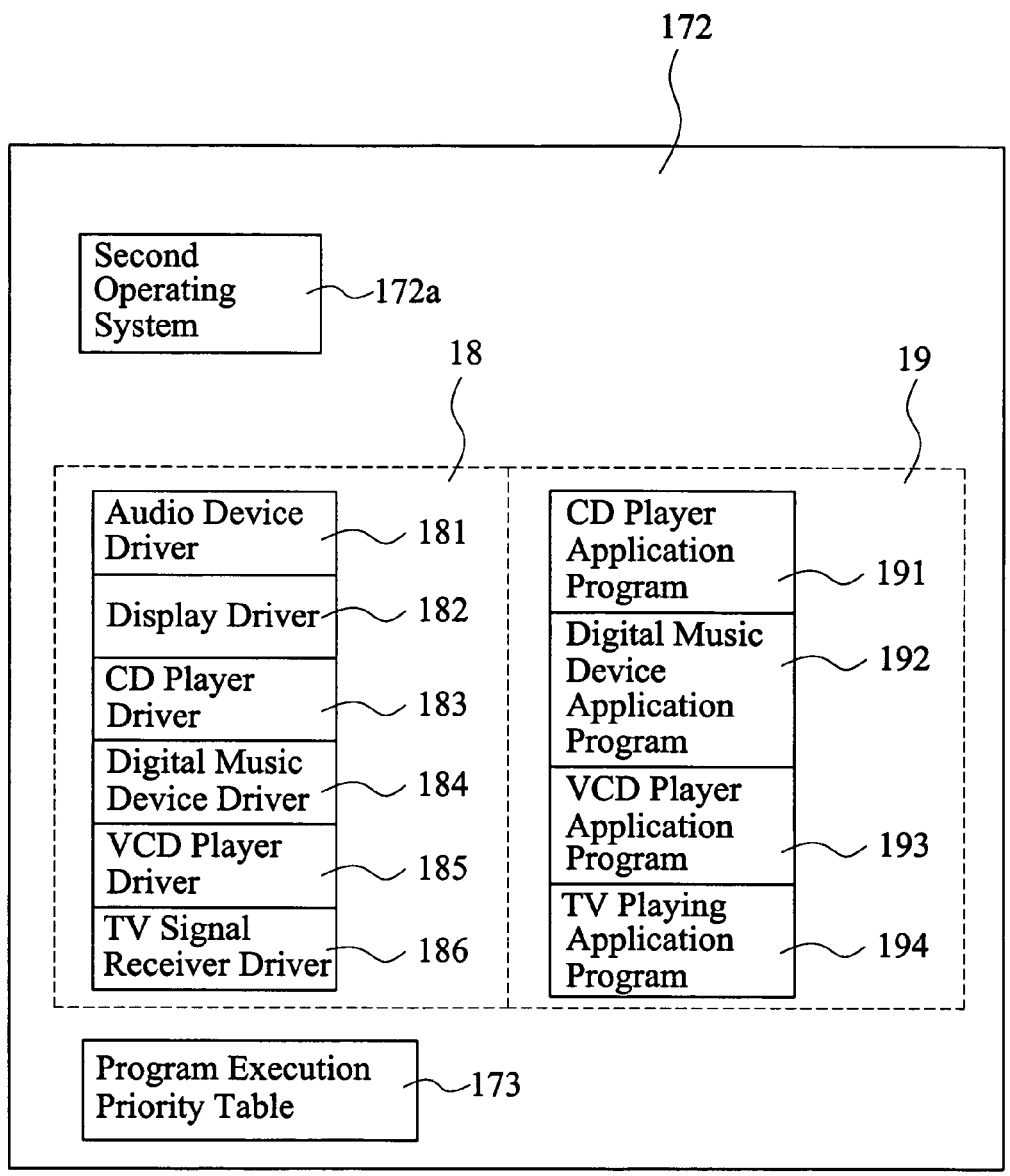
FIG. 2 shows a schematic view of the storing a plurality of device drivers and application programs in the second partition of FIG. 1.

Also referring to FIG. 2, which shows a schematic view of the contents of the device drivers 18 and the application programs 19 stored in the second partition 172 of FIG. 1. The device drivers 18 includes a plurality of device drivers, such as an audio device driver 181, a display driver 182, a CD player driver 183, a digital music device driver 184, a VCD player driver 185, and a TV signal receiver driver 186. The application programs 19 include a CD player application program 191, a digital music device application program 192, a VCD player application program 193, and a TV playing application program 194.

Figure 3:
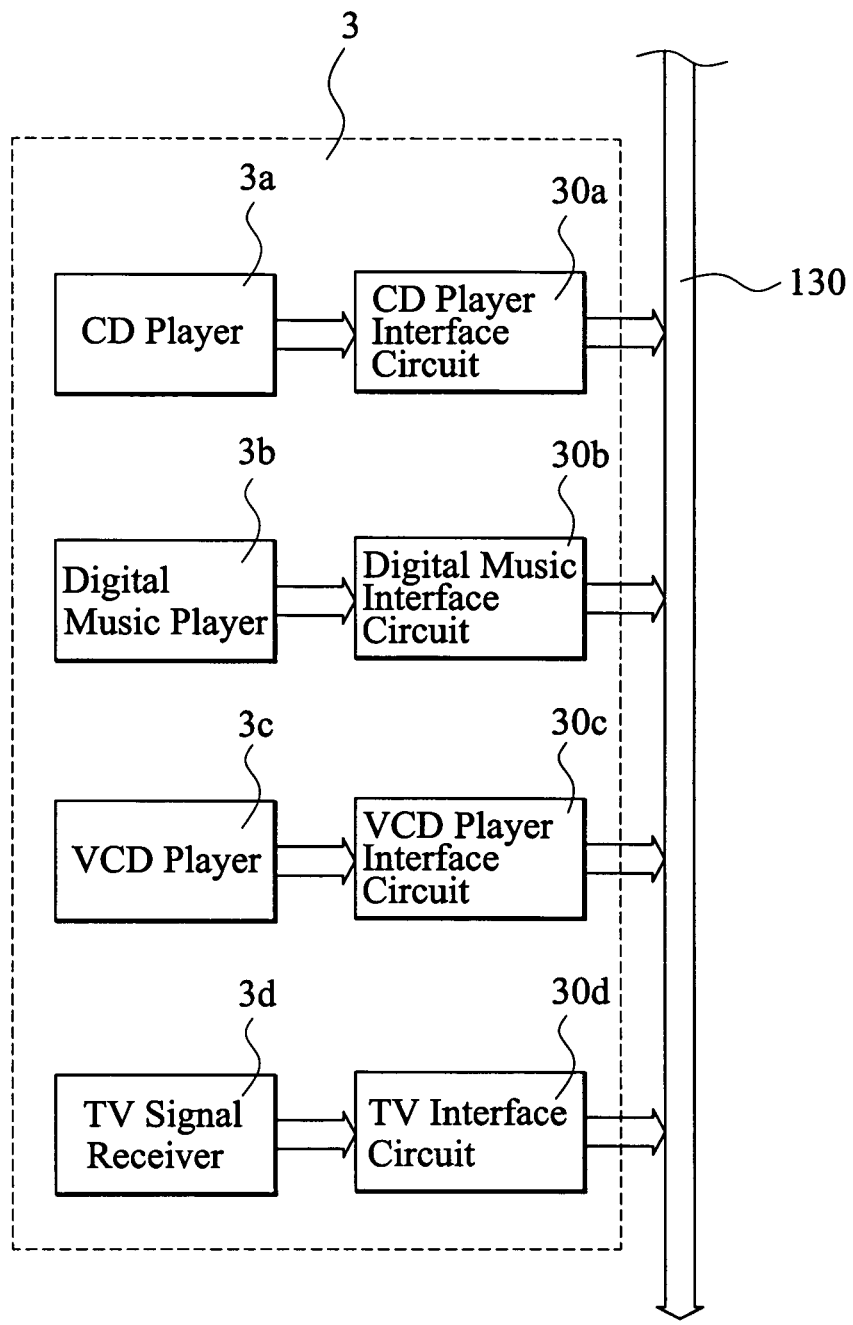
FIG. 3 shows a schematic view of the contents of the multimedia players of FIG. 1.

The second bus bridge 13 of the computer system 100 is connected to multimedia players 3 through a bus 130. FIG. 3 shows a schematic view of the multimedia players 3. In the embodiment of the present invention, the multimedia players 3 include a CD player 3a, a digital music player 3b, a VCD player 3c, a TV signal receiver 3d, which are connected to bus 130 through a CD player interface circuit 30a, a digital music interface circuit 30b, a VCD player interface circuit 30c, and a TV interface circuit 30d, respectively.

The second bus bridge 13 of the computer system 100 is connected to an audio device interface circuit 40 through the bus 130. The audio device interface circuit 40 is connected to an audio device 4. The second bus bridge 13 of the computer system 100 is also connected to a TV tuner 5 through the bus 130.

The hard disk 17 stores a program execution priority table 173. FIG. 4 shows a schematic view of the contents of the program execution priority table 173. The program execution priority table 173 includes a device selection button field, a device selection button code field, a device selection button corresponding device field, and a priority field for execution corresponding device driver and application program of the device.

The second bus bridge 13 of the computer system 100 is connected to a device selection button detection interface circuit 20 through the bus 130. The device selection button detection interface circuit 20 is further connected to a device selection button set 2. The device selection button set 2 includes device selection buttons 21, 22, 23, 24, which can be defined as the playing of CD, digital music, VCD, or TV. The user can operate the device selection buttons to activate the multimedia players, such as CD player, digital music device, VCD player or TV.

The device selection buttons 21, 22, 23, 24 can be defined as a control button for fast initialization of a multimedia player. The device selection buttons 21, 22, 23, 24 can be installed on the panels of the corresponding multimedia players, the buttons on the computer system, or the specific keys on the keyboard of the computer system. The specific keys can be decoded by the keyboard controller and recognized by the central processing unit of the computer system.

Figure 5:
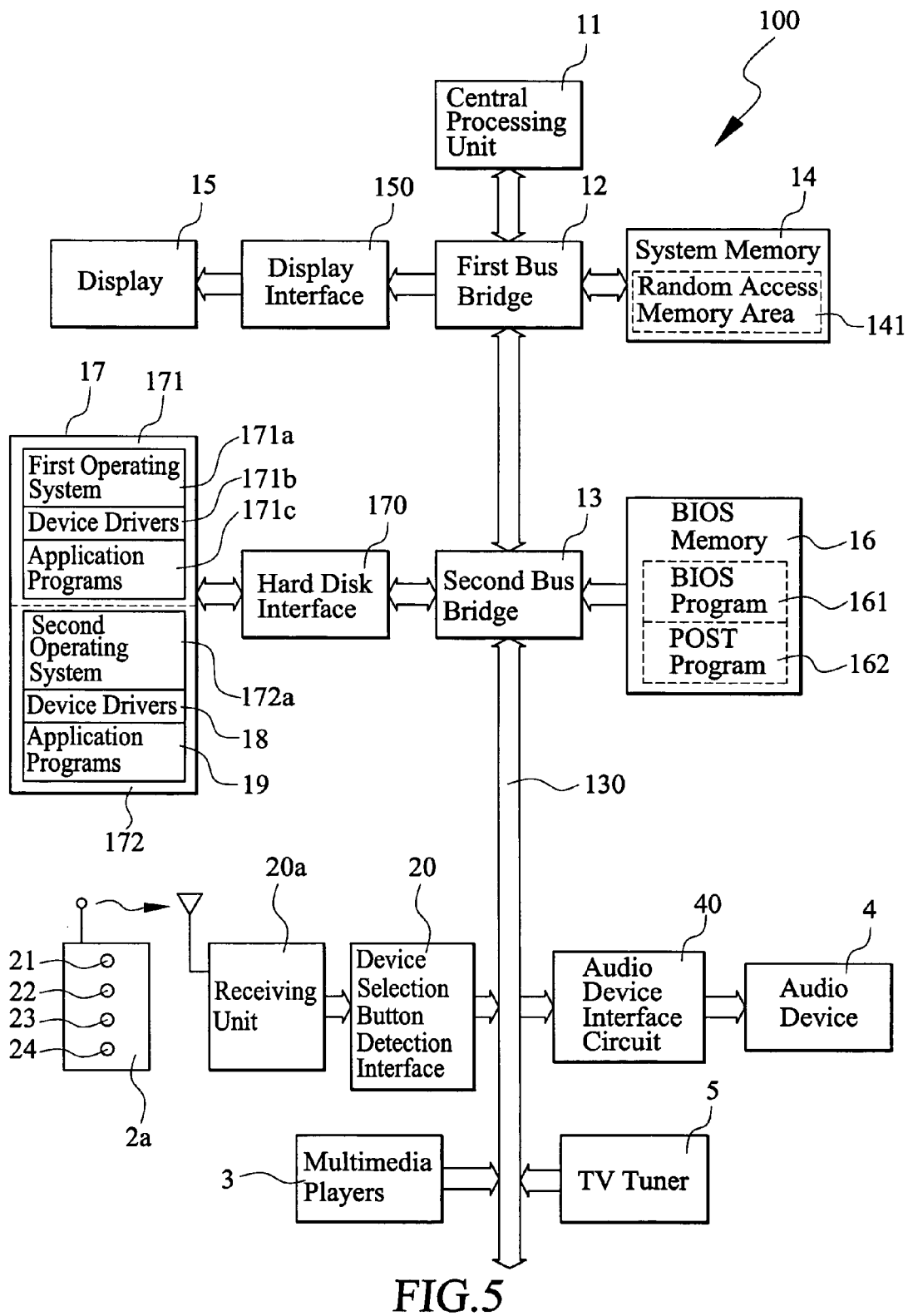
FIG. 5 shows a system functional block diagram of a second embodiment of the present invention.

FIG. 5 shows a system functional block diagram of the second embodiment of the present invention. In this embodiment, most of the components are the same as the components in FIG. 1. The difference lies in the connection of the device selection button detection interface circuit 20 to a receiving unit 20a, which can receive a wireless signal sent by a remote unit 2a, and the device selection buttons 21, 22, 23, 24 are installed on the remote unit 2a. When the user presses any device selection button 21, 22, 23, 24, the remote unit 2a sends a wireless signal, which is received by the receiving unit 20a, passing through the device selection button interface 20, the bus 130, the second bus bridge 13, the first bus bridge 12 to the central processing unit 11.

Figure 6:
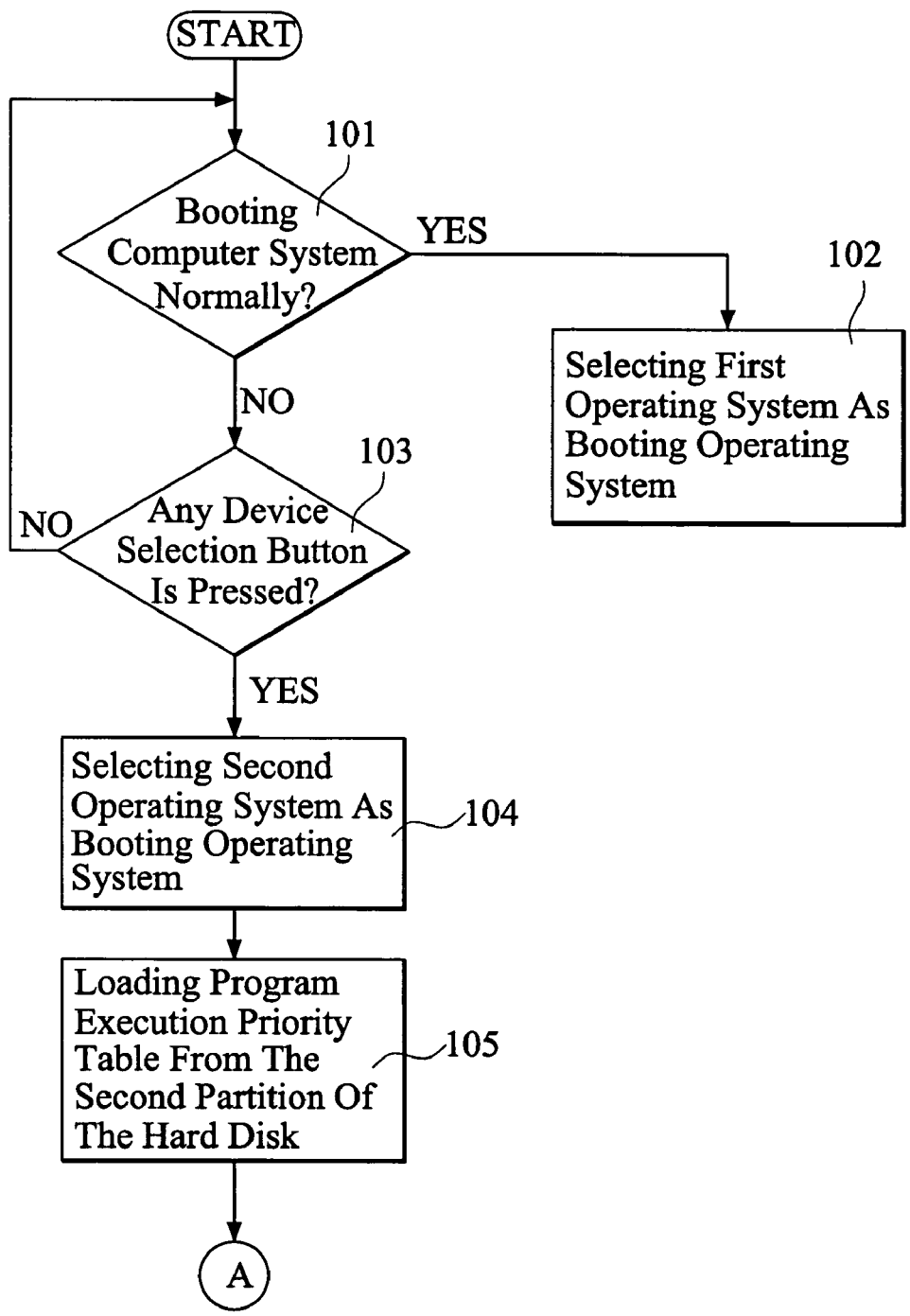
FIGS. 6 and 7 show a control flowchart of the embodiment of the present invention.
Figure 7:
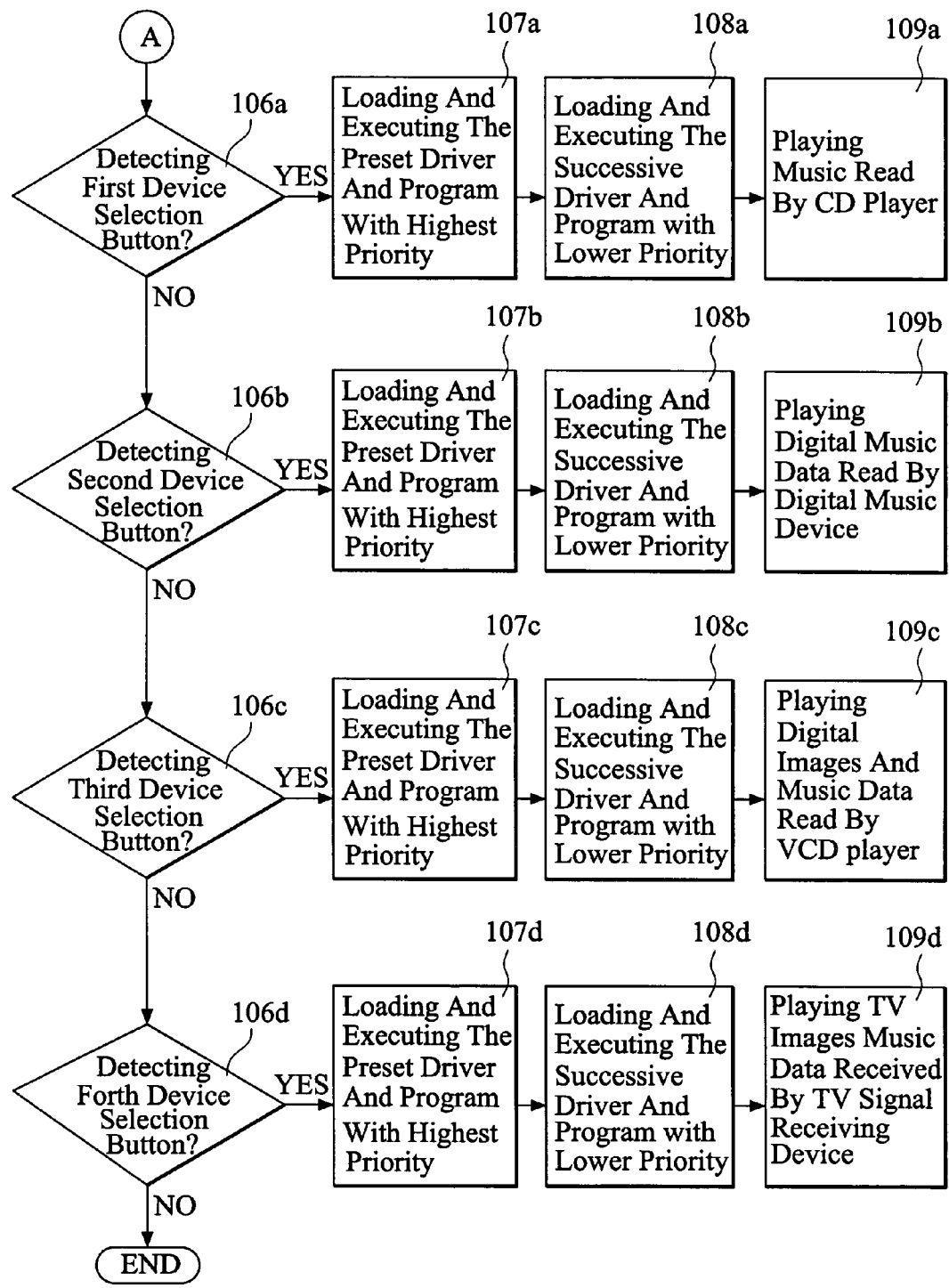

Referring to FIG. 6 and FIG. 7, which show the control flowchart of the embodiments of the present invention, when the user boots the computer system 100 normally (step 101), the computer system 100 selects the first operating system 171a in the first partition 171 of the hard disk 17 as the booting operating system, as in step 102, and completes the standard BIOS booting, including executing BIOS program, POST program, and the preset device driver 171b and the application program 171c stored in the first partition 171.

When any device selection button 21, 22, 23, 24 is pressed (step 103), the computer system 100 detects the action, and selects the second operating system 172a in the second partition 172 as the booting operating system (step 104).

Then, the computer system 100 loads the program execution priority table 173 from the second partition 172 of the hard disk 17 (step 105). The program execution priority table 173 can be loaded into a random access memory area 141 of the system memory 14.

After the computer system 100 completes the above booting process, the computer system 100 finds the multimedia player corresponding to the pressed device selection button and executes the playing of the multimedia player.

When the user presses the first device selection button 21 (step 106a), the computer system 100 finds the corresponding device selection button code and the corresponding device to be CD player 3a, as defined by program execution priority table 173. The computer system 100 loads the preset device driver and application program with the highest priority to the random access memory area 141 and executes the programs (step 107a). During the execution, the successive device drivers and application programs with lower priorities are loaded for execution (step 108a). For example, the execution priority order can be (1) the audio device driver 181, (2) the CD player driver 183, and (3) the CD player application program 191. Therefore, the CD player 3a and the audio device 4 are activated to play the music data read by the CD player 3a (step 109a).

When the user presses the second device selection button 22 (step 106b), the computer system 100 finds the corresponding device selection button code and the corresponding device to be digital music device 3b, as defined by the program execution priority table 173. The computer system 100 loads the preset device driver and application program with the highest priority from the second partition 172 of the hard disk 17 to the random access memory area 141 and executes the programs (step 107b). During the execution, the successive device drivers and application programs with lower priorities are loaded for execution (step 108b). For example, the execution priority order can be (1) the audio device driver 181, (2) the digital music device driver 184, and (3) the digital music device application program 192. Therefore, the digital music device 3b and the audio device 4 are activated to play the music data read by the digital music device 3b (step 109b).

When the user presses the third device selection button 23 (step 106c), the computer system 100 finds the corresponding device selection button code and the corresponding device to be VCD player 3c, as defined by the program execution priority table 173. The computer system 100 loads the preset device driver and application program with the highest priority from the second partition 172 of the hard disk 17 to the random access memory area 141 and executes the programs (step 107c). During the execution, the successive device drivers and application programs with lower priorities are loaded for execution (step 108c). For example, the execution priority order can be (1) the audio device driver 181, (2) the VCD player driver 185, and (3) the VCD player application program 193. Therefore, the VCD player 3c, the audio device 4, and the display 15 are activated to play the digital images and music data read by the VCD player 3a (step 109c).

When the user presses the forth device selection button 24 (step 106d), the computer system 100 finds the corresponding device selection button code and the corresponding device to be TV signal receiving device 3d, as defined by the program execution priority table 173. The computer system 100 loads the preset device driver and application program with the highest priority from the second partition 172 of the hard disk 17 to the random access memory area 141 and executes the programs (step 107d). During the execution, the successive device drivers and application programs with lower priorities are loaded for execution (step 108d). For example, the execution priority order can be (1) the audio device driver 181, (2) the display driver 186, and (3) the TV playing application program 194. Therefore, the TV signal receiving device 3d, the audio device 4, and the display 15 are activated to play the TV images and music data received by the TV signal receiving device 3d (step 109d).

While the invention has been described in connection with what is presently considered to the most practical and the best mode, it is to be understood that the invention is not to be limited to the disclosed embodiment and mode, but on the contrary, is intended to cover various modifications and equivalent arrangement included within the spirit and scope of the appended claims.

What is claimed is:

1. A method for executing computer programs in accordance with a preset priority in a computer system having a data storage, a system memory, a BIOS, a plurality of device selection buttons, and a plurality of multimedia players, the data storage being installed with a first operating system, a second operating system, a plurality of device drivers corresponding to a plurality of devices of each multimedia player, a plurality of device application programs, and a program execution priority table; the program execution priority table defining correspondence between device selection buttons and multimedia players and priority order of execution of the plurality of corresponding device drivers and the device application programs of the multimedia players; the method comprising the steps of:
   (a) detecting an operation status of each device selection button;
   (b) the computer using the second operating system to boot the computer upon detection of any device selection button being operated;
   (c) the computer loading the program execution priority table from the data storage after booting the second operating system;
   (d) finding a multimedia player corresponding to the operated device selection button according to the program execution priority table;
   (e) finding the device drivers and the device application programs corresponding to the multimedia player according to the program execution priority table; and
   (f) executing all of the device drivers and the device application programs corresponding to the multimedia player in the priority order defined by the program execution priority table.

2. The method as claimed in claim 1, wherein the data storage comprises a hard disk, which is segmented into a first partition and a second partition for storing the first operating system and the second operating system, respectively.

3. The method as claimed in claim 1 further comprising a step of selecting the first operating system to boot the computer system prior to step (a).

4. The method as claimed in claim 1, wherein the program execution priority table is loaded into a preset random access memory area in the system memory of the computer system in step (c).

5. The method as claimed in claim 1, wherein the device drivers and the device application programs of the multimedia player are loaded into a random access memory area of the system memory of the computer sequentially according to the priority order in step (f).

6. The method as claimed in claim 1, wherein the multimedia players defined by the program execution priority table comprise a CD player and an audio device, and wherein the execution priority order is audio device driver, CD player driver, and CD player application.

7. The method as claimed in claim 1, wherein the multimedia players defined by the program execution priority table comprise a digital music device and an audio device, and wherein the execution priority order is audio device driver, digital music device driver, and digital music device application.

8. The method as claimed in claim 1, wherein the multimedia players defined by the program execution priority table comprise a VCD player and an audio device, and wherein the execution priority order is audio device driver, VCD player driver, and VCD player application.

9. The method as claimed in claim 1, wherein the multimedia players defined by the program execution priority table comprise a TV signal receiving device, a TV tuner, and an audio device, and wherein the execution priority order is audio device driver, display driver, TV signal receiving device driver, and TV playing application.

10. A method for executing computer programs in accordance with a preset priority in a computer system having a data storage, a system memory, a BIOS, a plurality of device selection buttons, and a plurality of multimedia players, the data storage being installed with an operating system, a plurality of device drivers corresponding to a plurality of devices of each multimedia player, a plurality of device application programs, and a program execution priority table; the program execution priority table defining correspondence between device selection buttons and multimedia players and priority order of execution of the plurality of corresponding device drivers and the device application programs of the multimedia players; the method comprising the steps of:
   (a) detecting an operation status of each device selection button;
   (b) the computer using the operating system to boot the computer upon detection of any device selection button being operated;
   (c) the computer loading the program execution priority table from the data storage after booting the operating system;

(d) finding a multimedia player corresponding to the operated device selection button according to the program execution priority table;

(e) finding the device drivers and the device application programs corresponding to the multimedia player according to the program execution priority table; and (f) executing all of the device drivers and the device application programs corresponding to the multimedia player in the priority order defined by the program execution priority table.

11. The method as claimed in claim 10, wherein the program execution priority table is loaded into a preset random access memory area in the system memory of the computer in step (c).

12. The method as claimed in claim 10, wherein the device drivers and the device application programs of the multimedia player are loaded into a random access memory area of the system memory of the computer sequentially according to the priority order in step (f).

13. The method as claimed in claim 10, wherein the multimedia players defined by the program execution priority table comprise a CD player and an audio device, and wherein the execution priority order is audio device driver, CD player driver, and CD player application.

14. The method as claimed in claim 10, wherein the multimedia players defined by the program execution priority table comprise a digital music device and an audio device, and wherein the execution priority order is audio device driver, digital music device driver, and digital music device application.

15. The method as claimed in claim 10, wherein the multimedia players defined by the program execution priority table comprise a VCD player and an audio device, and wherein the execution priority order is audio device driver, VCD player driver, and VCD player application.

16. The method as claimed in claim 10, wherein the multimedia players defined by the program execution priority table comprise a TV signal receiving device, a TV tuner, and an audio device, and wherein the execution priority order is audio device driver, display driver, TV signal receiving device driver, and TV playing application.

* * * * *